US011248729B2

(12) United States Patent
Worst

(10) Patent No.: US 11,248,729 B2
(45) Date of Patent: Feb. 15, 2022

(54) HOT TAPPING DRILL APPARATUS

(71) Applicant: ULUTHANDO PTY LTD, Attadale (AU)

(72) Inventor: Barend Worst, Ardross (AU)

(73) Assignee: ULUTHANDO PTY LTD, Attadale WA (AU)

( * ) Notice: Subject to any disclaimer, the term of this patent is extended or adjusted under 35 U.S.C. 154(b) by 0 days.

(21) Appl. No.: 17/273,280

(22) PCT Filed: Aug. 7, 2019

(86) PCT No.: PCT/AU2019/050829
§ 371 (c)(1),
(2) Date: Mar. 3, 2021

(87) PCT Pub. No.: WO2020/051627
PCT Pub. Date: Mar. 19, 2020

(65) Prior Publication Data
US 2021/0207751 A1 Jul. 8, 2021

(30) Foreign Application Priority Data

Sep. 10, 2018 (AU) .............................. 2018903390

(51) Int. Cl.
*F16L 41/06* (2006.01)
(52) U.S. Cl.
CPC ..................... *F16L 41/06* (2013.01)
(58) Field of Classification Search
CPC ................... F16L 41/06; F16L 41/04
See application file for complete search history.

(56) References Cited

U.S. PATENT DOCUMENTS

| 1,956,129 A | 4/1934 | Mueller et al. |
| 2,767,600 A | 10/1956 | Mueller et al. |
| 6,640,827 B1 | 11/2003 | McClure |

(Continued)

FOREIGN PATENT DOCUMENTS

| CN | 106270641 A | 1/2017 |
| WO | 2011/011836 A1 | 2/2011 |

OTHER PUBLICATIONS

International Search Report for International Application No. PCT/AU2019/050829, dated Oct. 28, 2019, 5 pages.

(Continued)

*Primary Examiner* — Kevin L Lee
(74) *Attorney, Agent, or Firm* — TraskBritt

(57) ABSTRACT

A hot tapping drill apparatus comprising a housing, a rotation shaft arranged within the housing and comprising at least two secondary rotation shafts telescopically arranged and keyed to allow transmission of torque, one end of the rotation shaft extending outside the housing and configured to operatively receive a drill bit, in use. The drill apparatus also includes a translation shaft arranged within the housing and comprising at least two secondary translation shafts telescopically arranged via a complementary threaded engagement to allow for telescopic translation of the secondary translation shafts due to relative threaded rotation. Also included is a link assembly linking the rotation and translation shafts to allow independent rotation of the rotation shaft while coupling translation of both shafts.

12 Claims, 4 Drawing Sheets

(56) References Cited

U.S. PATENT DOCUMENTS

| | | | | |
|---|---|---|---|---|
| 2007/0104547 A1* | 5/2007 | Russell | ................... | F16L 41/06 |
| | | | | 408/1 R |
| 2016/0138747 A1* | 5/2016 | Butler | .................... | F16L 41/06 |
| | | | | 137/15.14 |
| 2019/0178758 A1* | 6/2019 | Nelson et al. | ........... | G01N 1/08 |

OTHER PUBLICATIONS

International Written Opinion for International Application No. PCT/AU2019/050829, dated Oct. 28, 2019, 7 pages.

* cited by examiner

HOT TAPPING DRILL APPARATUS

CROSS-REFERENCE TO RELATED APPLICATIONS

This application is a national phase entry under 35 U.S.C. § 371 of International Patent Application PCT/AU2019/050829, filed Aug. 7, 2019, designating the United States of America and published as International Patent Publication WO 2020/051627 A1 on Mar. 19, 2020, which claims the benefit under Article 8 of the Patent Cooperation Treaty to Australian Patent Application Serial No. 2018903390, filed Sep. 10, 2018.

TECHNICAL FIELD

This application relates to the field of hot tapping, in general, and more specifically to a hot tapping drill apparatus and an associated method for hot tapping.

BACKGROUND

The following discussion of the background art is intended to facilitate an understanding of the present application only. The discussion is not an acknowledgement or admission that any of the material referred to is or was part of the common general knowledge as at the priority date of the application.

Hot tapping or pressure tapping is a method of making a connection to existing piping or pressure vessels without the interrupting or emptying of that section of pipe or vessel. This generally means that a pipe or vessel, such as a tank, can continue to be in operation while maintenance or modifications are being done to it.

The process of hot tapping is also used to drain off pressurized casing fluids and add test points or various sensors, such as temperature and pressure, to existing piping or pressure vessels. Hot taps can range from a ½ inch hole designed for something as simple as quality control testing, up to a 48-inch tap for the installation of a variety of ports, valves, t-sections or other pipes.

A general hot tap procedure comprises installing a hot tap saddle or weld nozzle along with a valve and pressure testing the assembly before attaching hot tap drill apparatus. The installed valve is opened, hot tapping completed by drilling into the pipe or vessel while pressure is contained within the saddle or hot tapping apparatus.

The drill is then retracted and the valve closed, whereafter fluid is drained from the saddle and the hot tapping machine is removed. The tapped valve is now ready for tie-in or equipment to be inserted. In addition, hot tapping is also typically the first procedure in line stopping, where a hole saw is used to make an opening in a pipe so a line plugging head can be inserted.

Often, hot tapping must be done in confined spaces, such as excavations, where other utilities may be close by, such as electricity cables, gas supply, water pipes, data cables, etc. As a result, space for hot tapping under certain circumstances is typically limited. A need in the art for a hot tapping drill apparatus able to be used in confined spaces where conventional hot tapping drills cannot operate has been identified.

The current application was conceived with this shortcoming in mind in an attempt to propose, at least in part, possible improvements in amelioration of such shortcomings in the art of hot tapping drill apparatus.

BRIEF SUMMARY

According to a first aspect of the application there is provided a hot tapping drill apparatus comprising:
  a housing;
  a rotation shaft arranged within the housing and comprising at least two secondary rotation shafts telescopically arranged and keyed to allow transmission of torque, one end of the rotation shaft extending outside the housing and configured to operatively receive a drill bit;
  a translation shaft arranged within the housing and comprising at least two secondary translation shafts telescopically arranged via a complementary threaded engagement to allow for telescopic translation of the secondary translation shafts due to relative threaded rotation;
  a link assembly linking the rotation and translation shafts to allow independent rotation of the rotation shaft while coupling translation of the shafts;
  a first actuator configured to operatively actuate the rotation shaft to rotate; and
  a second actuator configured to operatively actuate the translation shaft, wherein rotation of the drill bit is operatively facilitated via the rotation shaft and translation of the drill bit relative to the housing is operatively facilitated via the translation shaft.

Typically, the housing is configured to operatively engage with a hot tapping valve arrangement or saddle via a suitable saddle engagement.

Typically, the housing defines at least one handle to facilitate manual handling and positioning of the drill apparatus.

Typically, the translation and rotation shafts are coaxially arranged within the housing.

Typically, the translation shaft is arranged about the rotation shaft, i.e., the rotation shaft is internal to the translation shaft.

Typically, the link assembly comprises a collar defined on one end of the rotation shaft, the collar operatively complementarily captured within a guide bearing on the translation shaft, so that translation of the translation shaft telescopes the rotation shaft while the rotation shaft is able to rotate freely.

Typically, the two secondary rotation shafts are complementarily keyed by one secondary rotation shaft defining a protruding key operatively slidably engaged in a complementary channel defined by the second rotation shaft, the key and channel enabling relative translation while allowing transmission of torque via the rotation shaft.

Typically, first actuator comprises a pneumatic, hydraulic and/or electromechanical actuator configured to operatively actuate an end of the rotation shaft distal from the drill bit end.

Typically, the first actuator is configured to actuate the rotation shaft via a ring and pinion gear arrangement.

Typically, the second actuator comprises a pneumatic, hydraulic, electromechanical and/or mechanical actuator configured to actuate one of the at least two secondary translation shafts to allow for telescopic translation of the other secondary translation shaft due to relative threaded rotation via the complementary threaded engagement.

Typically, the second actuator is configured to actuate the translation shaft at an end thereof distal from the link assembly.

Typically, the second actuator is configured to actuate the translation shaft via a worm drive arrangement.

Typically, the drill apparatus includes at least one guide bar configured to guide telescopic translation of one secondary translation shaft relative to the other secondary translation shaft.

Typically, the at least one guide bar is coaxially arranged with the translation shaft within the housing.

Typically, the drill apparatus includes a plurality of guide bars arranged in parallel within the housing.

According to a second aspect of the application there is provided a method for hot tapping, the method comprising the steps of:

providing drill apparatus in accordance with the first aspect of the application; and hot tapping a vessel or pipe using the drill apparatus.

Typically, the step of hot tapping includes the step of actuating the rotation shaft, via the first actuator, in order to rotate the drill bit.

Typically, the step of hot tapping includes the step of actuating, via the second actuator, the translation shaft to translate the drill bit away from or toward the housing.

BRIEF DESCRIPTION OF THE DRAWINGS

The description will be made with reference to the accompanying drawings in which.

DETAILED DESCRIPTION

Figure 1:
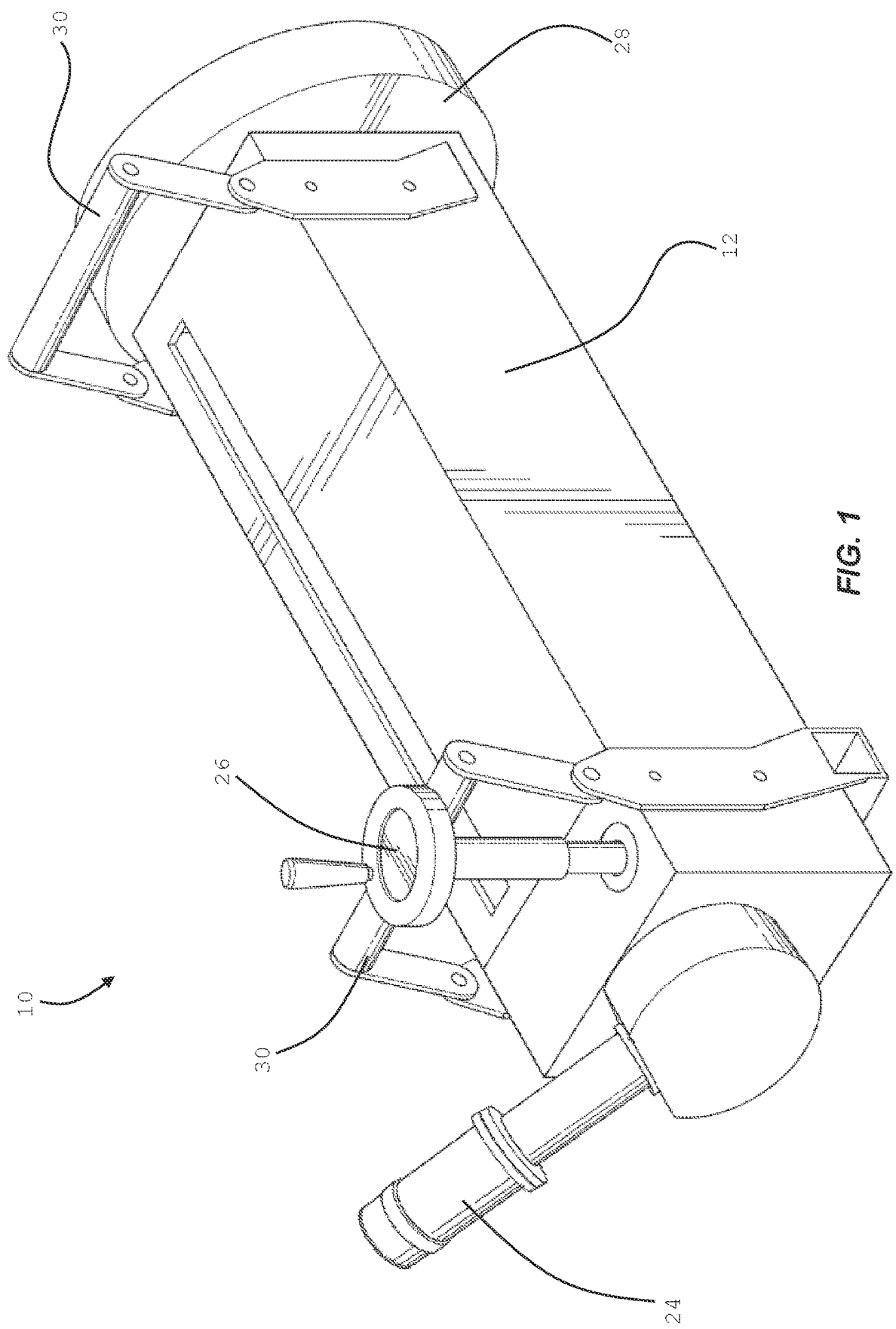
FIG. 1 is a diagrammatic perspective view representation of one embodiment of a hot tapping drill apparatus in accordance with as aspect of the application.
Figure 2:
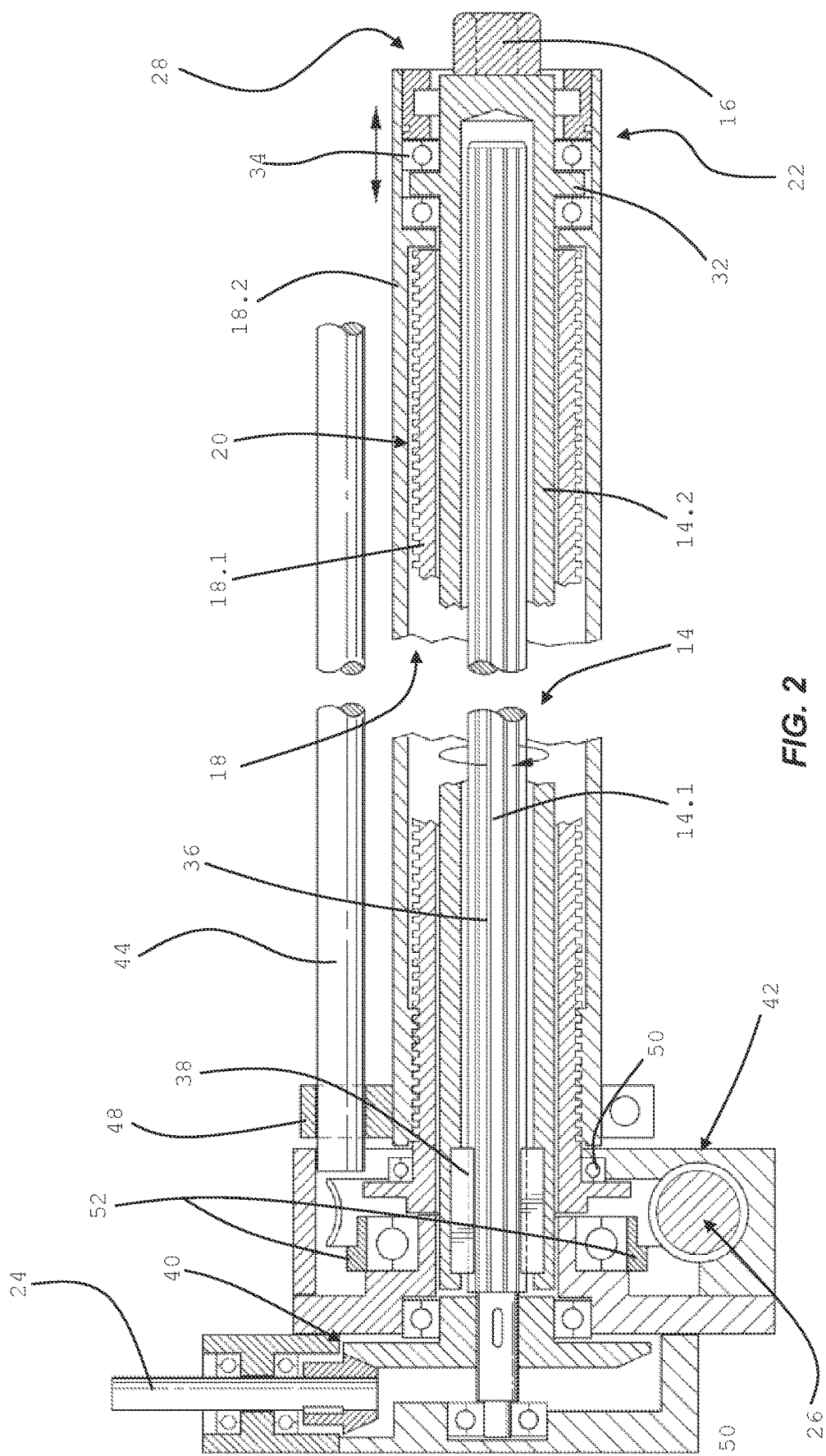
FIG. 2 is a diagrammatic side-sectional view representation of the hot tapping drill arrangement of FIG. 1.

Further features of the present application are more fully described in the following description of several non-limiting embodiments thereof. This description is included solely for the purposes of exemplifying the present application to the skilled addressee. It should not be understood as a restriction on the broad summary, disclosure or description of the application as set out above. In the figures, incorporated to illustrate features of the example embodiment or embodiments, like reference numerals are used to identify like parts throughout.

With reference now to the accompanying figures, there is shown one example of a hot tapping drill apparatus 10. In the exemplified embodiment, the drill apparatus 10 comprises a housing 12, a rotation shaft 14 for operatively receiving a drill bit at one end 16 thereof, a translation shaft 18, a link assembly 22, a first actuator 24 and a second actuator 26, all described in more detail below.

The rotation shaft 14 is arranged within the housing 12 and generally comprises at least two secondary rotation shafts 14.1 and 14.2 that are telescopically arranged and keyed to allow transmission of torque, the one end 16 of the rotation shaft 14 typically extending outside the housing 12 and configured to operatively receive a drill bit (not shown).

Figure 3:
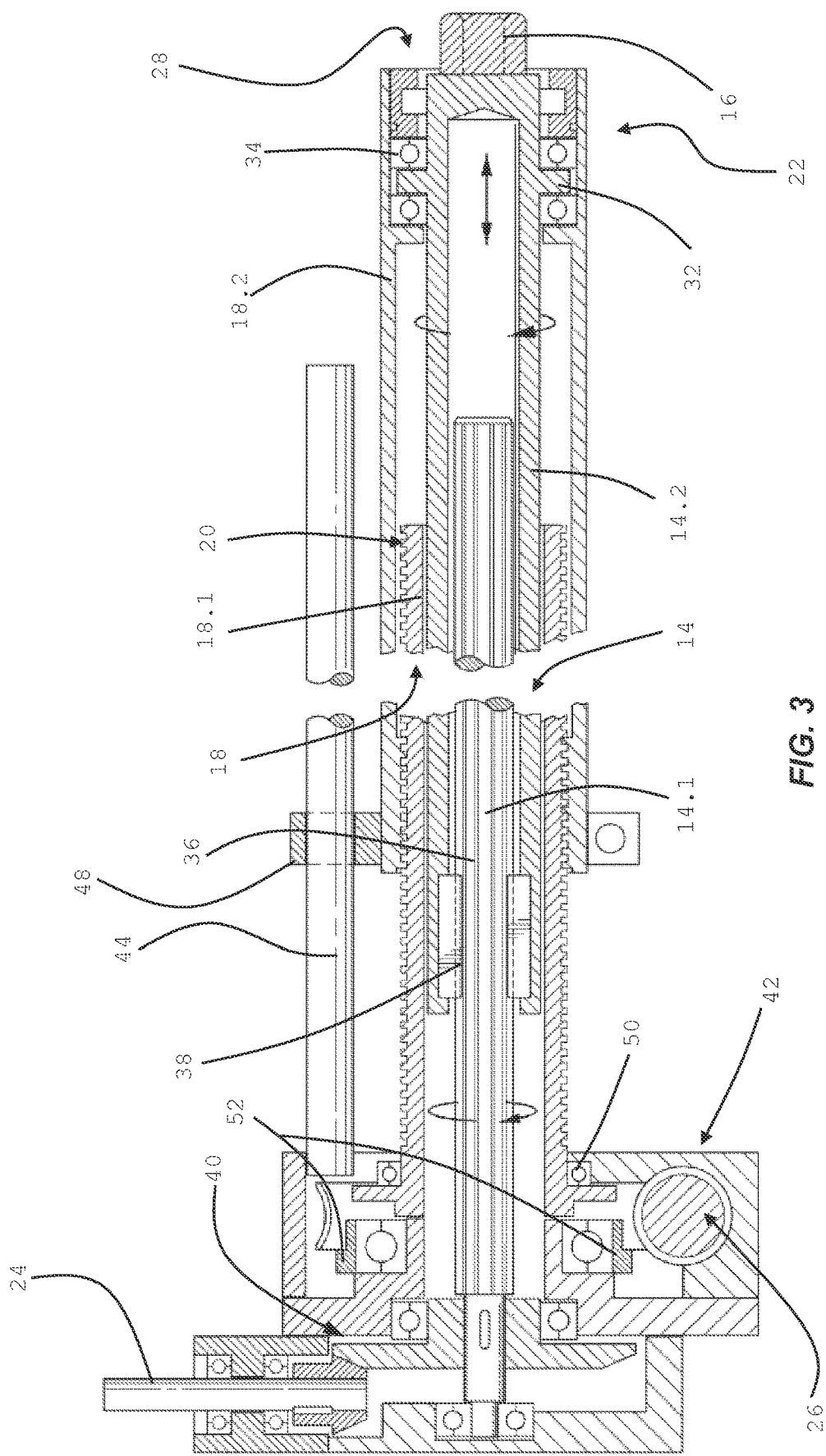
FIG. 3 is a diagrammatic side-sectional view representation of the hot tapping drill arrangement of FIG. 1 showing a translation shaft in a translated or extended position.
Figure 4:
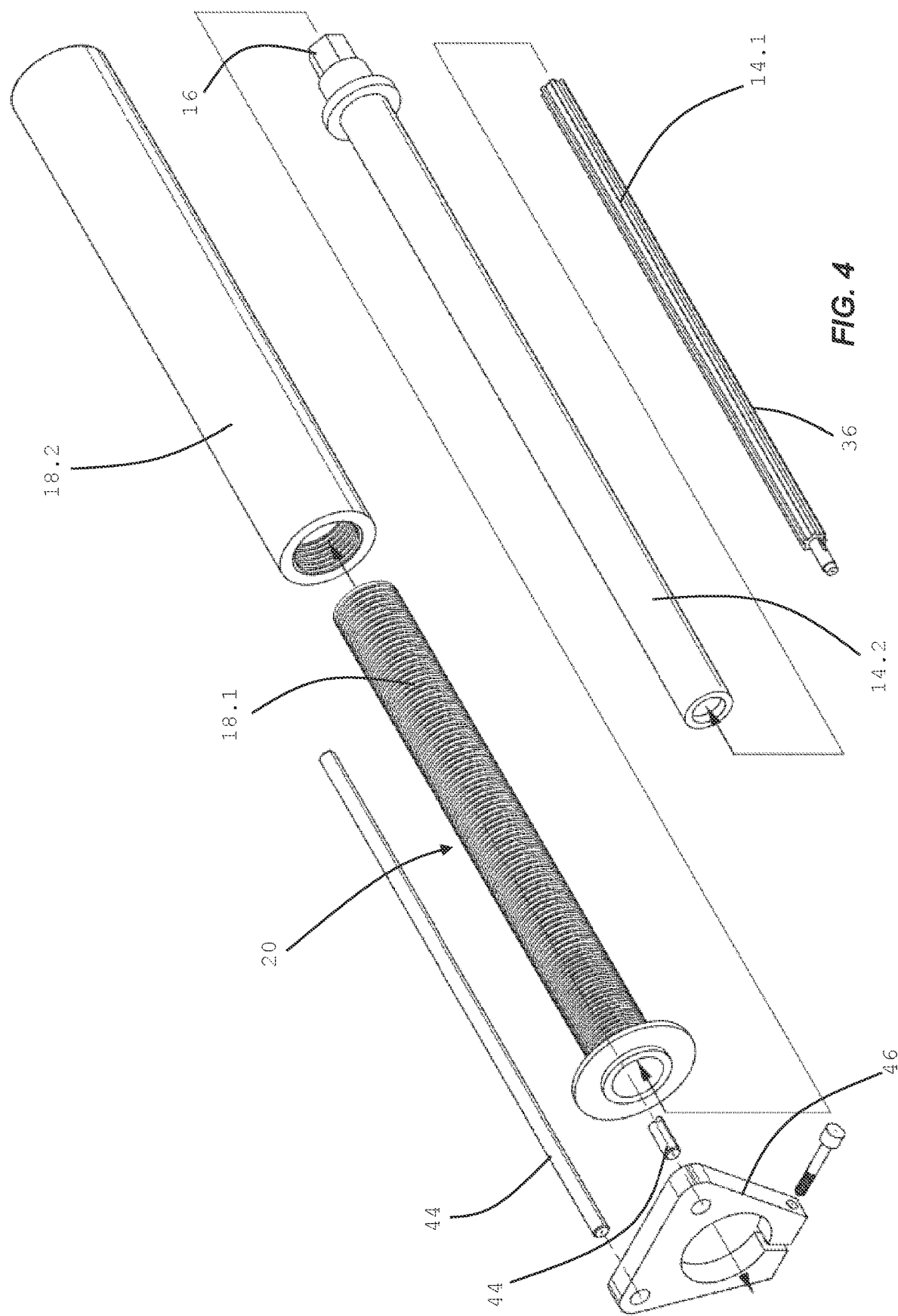
FIG. 4 is a diagrammatic exploded-view representation of a translation and rotation shafts of the hot tapping drill apparatus of FIG. 1.

Similarly, the translation shaft 18 is arranged within the housing 12 and typically comprises at least two secondary translation shafts 18.1 and 18.2 that are telescopically arranged via a complementary threaded engagement 20 in order to allow for telescopic translation of the secondary translation shafts 18.1 and 18.2 due to relative threaded rotation. In this manner, rotating (in this example) the inner secondary translation shaft 18.1 results in the outer secondary translation shaft 18.2 being extended (as seen in FIG. 3) along the threaded engagement 20 relative to the inner secondary translation shaft 18.1.

The link assembly 22 operatively links the rotation and translation shafts 14 and 18 to allow independent rotation of the rotation shaft 14 while coupling translation of both shafts 14 and 18 together. In this manner, as described below, the rotation shaft 14 enables operative drilling via a drill bit attachable at end 16, while translation shaft 18 facilitates telescopic extension or retraction of the drill bit.

In the exemplified embodiment, the translation and rotation shafts 14 and 18 are coaxially arranged within the housing 12. The translation shaft 18 is arranged about the rotation shaft 14, as shown, i.e., the rotation shaft 14 is coaxially internal to the translation shaft 18. However, the skilled addressee will appreciate that the rotation shaft 14 can also be arranged about the translation shaft 18, or the like, and that such other embodiments are possible and within the scope of the application.

The link assembly 22 typically comprises a collar 32 defined on one end 16 of the rotation shaft 14, as shown, the collar 32 operatively and complementarily captured within a guide bearing 34 on the translation shaft 18. In this manner, operative translation of the translation shaft 18 telescopes the rotation shaft 14 while the rotation shaft 14 is able to rotate freely in order to facilitate drilling.

In order to enable this functionality, the two secondary rotation shafts 14.1 and 14.2 are generally complementarily keyed via one secondary rotation shaft 14.1 defining a protruding key 36 or the like, which is operatively and slidably engaged in a complementary channel 38 defined by the second rotation shaft 14.2. This keyed arrangement of key 36 and channel 38 enables relative translation between secondary rotation shafts 14.1 and 14.2 while allowing transmission of torque via the overall rotation shaft 14. As before, the skilled addressee will appreciate that other arrangements are possible whereby translation with torque transmission can be achieved, such arrangements being within the scope of the application.

By drill apparatus 10 having this configuration of the two secondary rotation shafts 14.1 and 14.2 enabling relative translation while still allowing transmission of torque via the overall rotation shaft 14, drill apparatus 10 is able to be used in confined spaces where conventional hot tapping drills cannot operate. Drill apparatus 10 can be manufactured more compact than conventional hat tapping drills, while allowing similar drill distances, i.e., lengthwise translation of the two secondary rotation shafts 14.1 and 14.2, with similar torque transmission.

Also included are first and second actuators 24 and 26. The first actuator 24 is configured to operatively actuate the rotation shaft 14 to rotate, e.g., in order to rotate a drill bit attachable at end 16. The second actuator 26 is configured to operatively actuate the translation shaft 18 as needed, wherein rotation of the drill bit is operatively facilitated via the rotation shaft 14 and translation of the drill bit relative to the housing 12 is operatively facilitated via rotation shaft 14 18, as described above.

Drill apparatus 10 enables decoupling of the translation actuator from the rotation actuator, providing additional benefit. By having the rotation shaft 14 and translation shaft 18 separately actuated, as described, allows better drilling control in a compact package, providing further improvement over conventional hot tapping drill apparatus. For example, a higher force actuator may be used for the first actuator 24 to operatively actuate the rotation shaft 14 to rotate a drill bit for drilling, with a lower force actuator required for the second actuator 26 to actuate the translation shaft 18. Of course, variations hereon are possible and within the scope of the application.

Typically, the first actuator 24 may comprise a pneumatic, hydraulic and/or electromechanical actuator configured to operatively actuate an end of the rotation shaft 14 distal from the drill bit end 16, as shown. In the exemplified embodiment, the first actuator 24 is configured to actuate the rotation shaft 14 via a ring and pinion gear arrangement 40, including suitable bearings 50 and bushing 52, as shown. However, the skilled addressee will appreciate that other arrangements are possible whereby the first actuator 24 may actuate the rotation shaft 14.

Similarly, the second actuator 26 may comprise a pneumatic, hydraulic, electromechanical and/or mechanical actuator configured to actuate one of the at least two secondary translation shafts 18.1 and 18.2 to allow for telescopic translation of the other secondary translation shaft due to relative threaded rotation via the complementary threaded engagement 20, as described above. Due to the threaded engagement 20, an outer or inner translation shaft 18.1 or 18.2 may be actuated to achieve relative translation, depending on requirements. Typically, the second actuator 26 is configured to actuate the translation shaft 18 at an end thereof distal from the link assembly 22, as shown. In the exemplified embodiment, the second actuator 26 is configured to actuate the translation shaft 18 via a worm drive arrangement 42, but other arrangements are possible and within the scope of the application.

The housing 12 is typically configured to operatively engage with a hot tapping valve arrangement or saddle (not shown) via a suitable saddle engagement 28, such as via a suitable flange, or the like. The housing 12 also typically defines at least one handle 30 to facilitate manual handling and positioning of the drill apparatus 10.

The drill apparatus 10 further generally includes at least one guide bar 44 configured to guide telescopic translation of one secondary translation shaft 18.2 relative to the other secondary translation shaft 18.1, as shown. Typically, the at least one guide bar 44 is coaxially arranged with the translation shaft 18 (and coaxial rotation shaft, by extension) within the housing 12. The exemplified embodiment of the drill apparatus 10 includes a plurality of guide bars 44 arranged in parallel within the housing 12 via a suitable mechanical brace 46, as shown, with suitable guide followers 48.

The skilled address will appreciate that the application includes an associated method for hot tapping, the method typically comprising the steps of providing an embodiment of drill apparatus 10 and hot tapping a vessel or pipe using the drill apparatus 10 as is generally known in the art.

This step of hot tapping typically includes the step of actuating the rotation shaft 14, via the first actuator 24, in order to rotate a drill bit operatively attached to end 16, as described above. The step of hot tapping further generally includes the step of actuating, via the second actuator 26, the translation shaft 18 to translate the drill bit on end 16 away from or toward the housing 12, as required.

It is particularly advantageous that the application provides for a hot tapping drill apparatus 10 useful for performing hot tapping operations in confined spaces. In particular, it is believed that the telescopic coaxial rotation and translation shafts 14 and 18 described herein provide novel and inventive improvements to the art of hot tapping drill apparatus.

Optional embodiments of the application may also be said to broadly consist in the parts, elements and features referred to or indicated herein, individually or collectively, in any or all combinations of two or more of the parts, elements or features, and wherein specific integers are mentioned herein that have known equivalents in the art to which the application relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "said," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the application, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the application, while other aspects are exemplified in a different example. These examples are intended to assist the skilled person in performing the invention and are not intended to limit the overall scope of the invention in any way unless the context clearly indicates otherwise. Variations (e.g., modifications and/or enhancements) of one or more embodiments described herein might become apparent to those of ordinary skill in the art upon reading this application. Skilled artisans are expected to employ such variations as appropriate, and it is intended for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. Hot tapping drill apparatus comprising:
   a housing;
   a rotation shaft arranged within the housing and comprising at least two secondary rotation shafts telescopically arranged and complementarily keyed to allow transmission of torque, one end of the rotation shaft extending outside the housing and configured to operatively receive a drill bit;
   a translation shaft arranged within the housing about the rotation shaft and comprising at least two secondary translation shafts telescopically arranged via a complementary threaded engagement to allow for telescopic translation of the secondary translation shafts due to relative threaded rotation;
   a link assembly linking the rotation and translation shafts to allow independent rotation of the rotation shaft while coupling translation of the shafts, the link assembly comprising a collar defined proximate the drill bit end of the rotation shaft, the collar operatively complementarily captured within a guide bearing on the translation shaft, so that translation of the translation shaft telescopes the rotation shaft while the rotation shaft is able to rotate freely;
   a first actuator configured to operatively actuate an end of the rotation shaft distal from the drill bit end to rotate the rotation shaft; and
   a second actuator configured to operatively actuate the translation shaft at an end thereof distal from the link assembly, wherein rotation of the drill bit is operatively facilitated via the rotation shaft and translation of the drill bit relative to the housing is operatively facilitated via the translation shaft, both rotation and translation shafts actuatable at the end distal from the drill bit.

2. The apparatus of claim 1, wherein the housing is configured to operatively engage with a hot tapping valve arrangement or saddle via a suitable saddle engagement.

3. The apparatus of claim 1, wherein the housing defines at least one handle to facilitate manual handling and positioning of the drill apparatus.

4. The apparatus of claim 1, wherein the translation shaft and the rotation shaft are coaxially arranged within the housing.

5. The apparatus of claim 1, wherein one of more of the first actuator and the second actuator comprises one or more of a pneumatic actuator, a hydraulic actuator, a mechanical actuator, and an electromechanical actuator.

6. The apparatus of claim 1, wherein the first actuator is configured to actuate the rotation shaft via a ring and pinion gear arrangement.

7. The apparatus of claim 1, wherein the second actuator is configured to actuate the translation shaft via a worm drive arrangement.

8. The apparatus of claim 1, further comprising at least one guide bar configured to guide telescopic translation of one of the at least two secondary translation shafts relative to another of the at least two secondary translation shafts.

9. The apparatus of claim 8, further comprising a plurality of guide bars arranged in parallel within the housing.

10. A method for hot tapping, the method comprising:
    providing the hot tapping of claim 1; and
    hot tapping a vessel or pipe using the hot tapping drill apparatus.

11. The method of claim 10, wherein hot tapping comprises actuating the rotation shaft, via the first actuator, in order to rotate the drill bit.

12. The method of claim 10, wherein hot tapping comprises actuating, via the second actuator, the translation shaft to translate the drill bit away from or towards the housing.

* * * * *

UNITED STATES PATENT AND TRADEMARK OFFICE
CERTIFICATE OF CORRECTION

PATENT NO. : 11,248,729 B2  
APPLICATION NO. : 17/273280  
DATED : February 15, 2022  
INVENTOR(S) : Barend Worst Page 1 of 1

It is certified that error appears in the above-identified patent and that said Letters Patent is hereby corrected as shown below:

In the Claims

Claim 10, Column 8, Line 27, change "providing the hot tapping of claim 1; and" to --providing the hot tapping drill apparatus of claim 1; and--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*